United States Patent
Shelton et al.

[15] 3,677,170
[45] July 18, 1972

[54] PRESSURE COOKING APPARATUS

[72] Inventors: Winston L. Shelton, Jeffersontown; Eugene A. Pottinger, Louisville, both of Ky.

[73] Assignee: Commercial Appliances, Inc., Jeffersontown, Ky.

[22] Filed: Sept. 29, 1970

[21] Appl. No.: 76,557

[52] U.S. Cl. ............................99/337, 99/408, 220/55 PC
[51] Int. Cl. ..................................................A47j 37/12
[58] Field of Search.................99/403, 407, 408, 330, 337, 99/338; 220/55 PC, 55.3, 44 E; 126/380

[56] References Cited

UNITED STATES PATENTS

| | | |
|---|---|---|
| 2,338,964 | 1/1944 | Pappas....................................99/408 |
| 2,355,150 | 8/1944 | De Simone............................220/55 X |
| 2,532,639 | 12/1950 | Payne ...................................99/403 X |
| 3,194,662 | 7/1965 | Nelson..................................99/403 X |
| 3,501,316 | 3/1970 | Guthrie..................................99/407 X |

*Primary Examiner*—Billy J. Wilhite
*Attorney*—William E. Sherwood

[57] ABSTRACT

An apparatus for cooking food under pressure in a basket while immersed in a batch of cooling liquid includes a separable unit for collecting particles of food dropping from the basket, and for enhancing the useful life of the liquid and the edibility of the food. The cooking vessel is controllably heated and the apparatus is provided with a plurality of pressure relieving means for protection of the user.

7 Claims, 8 Drawing Figures

Patented July 18, 1972

INVENTORS
WINSTON L. SHELTON
EUGENE A. POTTINGER

BY W.E. Sherwood

ATTORNEY

Patented July 18, 1972    3,677,170
3 Sheets-Sheet 2

INVENTORS
WINSTON L. SHELTON
EUGENE A. POTTINGER

BY W. E. Sherwood
ATTORNEY

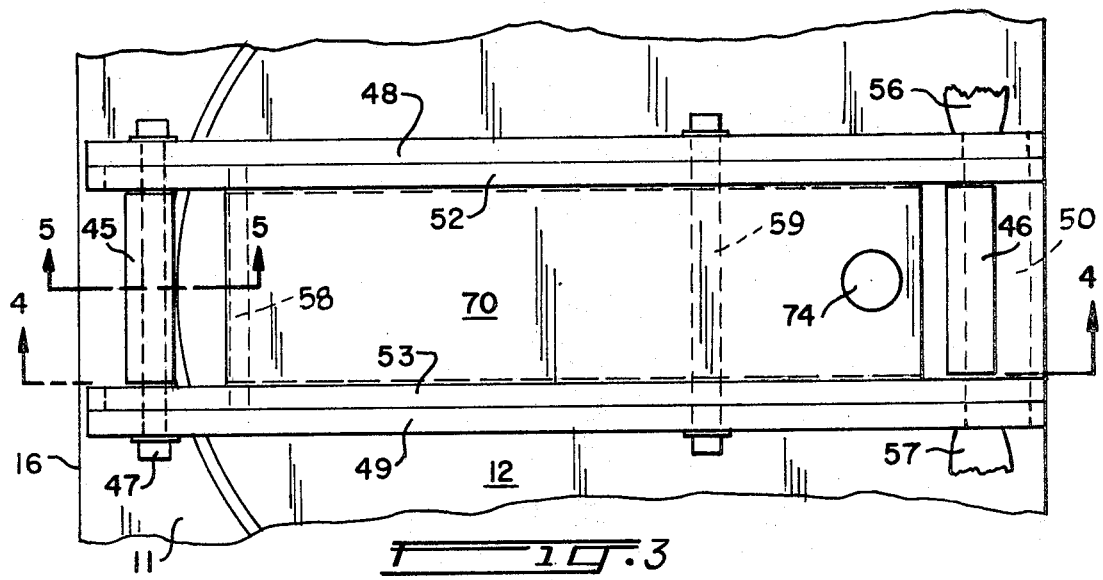
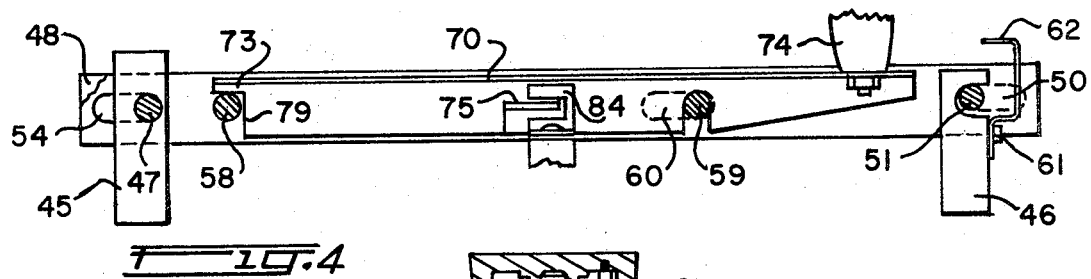
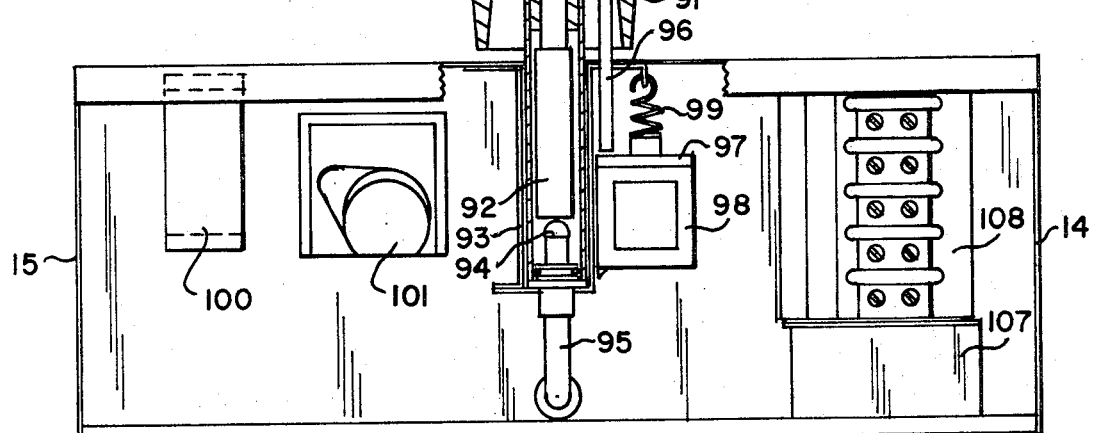
INVENTORS
WINSTON L. SHELTON
EUGENE A. POTTINGER
BY W. E. Sherwood
ATTORNEY

PRESSURE COOKING APPARATUS

BACKGROUND OF THE INVENTION

This invention relates to deep fat pressure frying of various foods and is particularly well suited for use in commercial establishments serving foods as fried chicken, shrimp, frankfurters, hamburgers, potatoes or the like. It has long been known that for optimum operation of this type of apparatus wherein particles of food, for example, breaded portions of chicken, tend to become mixed with the cooking liquid, some provisions must be made for clarifying such liquid and for keeping the particles from contact with heated surfaces which frequently are heated to 325° F. or higher. Furthermore, the particles themselves have utility for various purposes, such as a gravy stock, and should not be scorched or discolored.

Customarily, a filtration system as disclosed, for example in Hartzog U.S. Pat. No. 3,466,997, or a removable collector unit such as indicated in Piotrowski U.S. Pat. No. 3,495,525, or some equivalent arrangement is employed to serve this purpose. However, the apparatus even when suitably equipped for keeping the body of cooking liquid in optimum condition must also provide for regulated heating of the liquid, and for safe release at appropriate stages of operation of the pressure which builds up in the apparatus. Many proposals have been advanced for the solution of these combined factors of safe operation, clarity of liquid and controlled heating, but, so far as we are aware, have required relatively complex and expensive apparatus. It is a purpose of the present invention to overcome these problems by means of an improved apparatus characterized by its reliability of operation, safety, and adaptability to cooking various foods in a readily controlled manner.

SUMMARY

The invention comprises a cooking apparatus having a vessel operating under pressure and containing a batch of liquid fat which is heated by electrical coils in the vessel. The cooking cycle is under control of a timer and a thermostat, and safety means including both an automatically operable device and a manually operable device are provided for venting vapors from the cooking vessel.

A removable collector unit is attached to the lower end of the cooking vessel in open communication therewith and retains food particles dropping from the vessel. The liquid in the collector unit is relatively quiescent and cool and being out of the path of convection currents permits the loose food particles to be segregated from the main body of liquid which thus remains in a more clarified condition with resulting improvement in the taste of the cooked food.

An improved cover for the cooking vessel supports both a manually operable relief valve and an arrangement of structure for operating that valve and for preventing a sudden raising of the cover. The electrical circuit includes a solenoid which is energized during the energization of a timer and which serves to open an automatically operable relief valve whenever the timer is inoperative.

Among the objects of the invention are the provision of an improved cooking vessel having a removable collector unit for food particles; the provision of an improved system for controllably heating a pressure cooking apparatus; the provision of a pressure cooking apparatus having a plurality of pressure relieving safety means including an automatic pressure relief operable when a predetermined pressure is attained and a supplementary pressure relieving means operable when the cooked food is to be removed; the provision of an improved safety latch for the cover of a pressure cooking vessel; and the provision of a deep fryer cooking vessel having elements arranged to enchance the useful life of the cooking liquid and the cleaning of the apparatus.

These and other objects and advantages will become more apparent as the description proceeds and when considered in conjunction with the accompanying drawings in which FIG. 1 is a perspective view of the apparatus as seen from the front and with the cooking vessel cover mounted for pivotal movement in one direction.

FIG. 3 is a plan view of the cover as mounted on the top of the cabinet and with a safety opening slide latch as employed in FIG. 2.

FIG. 4 is a side elevation view of the slide latch as taken on line 4—4 of FIG. 3.

FIG. 6 is a rear elevation view of the control housing as taken on line 6—6 of FIG. 2.

Figure 1:
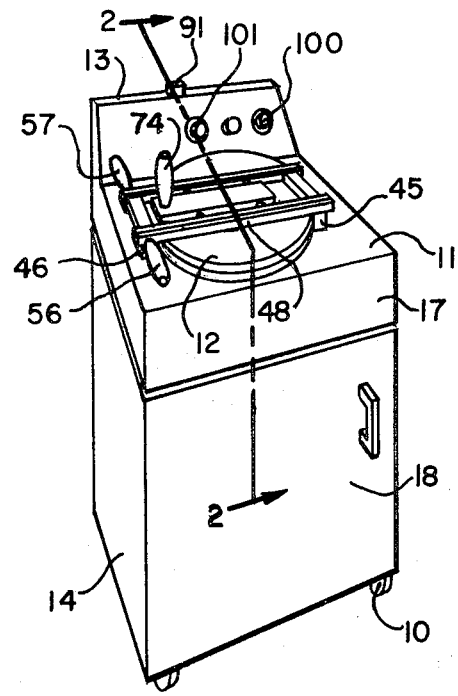

Referring now to FIG. 1, a cabinet which may be mounted on wheels 10 includes a generally flat top 11 having a central opening closed by a hinged cover 12, and with an upwardly extending rear plate 13 on the back of which electrical elements later to be described, are suitably housed. Side walls 14, 15 and a rear wall 16 are attached to the top 11 and an upper front panel 17 likewise is attached to the same cabinet top. Below this panel an access door 18 hinged to one of the sidewalls is provided for ready access to the collector unit 19 (FIG. 2) the mounting and functioning of which forms a significant feature of the invention.

A tubular metallic vessel having an upper rim 20 with an undercut shoulder resting on the top 11 and attached thereto as by a fastening 21 extends downwardly within the cabinet. The lower wall portion 22 of the vessel slopes toward the central lower opening of the vessel and includes an annular boss 23 on the outer periphery of which a slot is formed for retention of an O-ring seal 24. A cup-shaped collector unit 19 with a smooth inner periphery at the top bears against the seal and is detachably locked in operative position by a conventional cam lock structure 25 mounted on the lower side of wall portion 22. A plurality of handles 26 projecting laterally from the unit 19 enable the unit to be unlocked and removed at appropriate times. Also attached to the unit near the top portion is a downwardly inclined drain pipe 27 having a valve 28 therein.

The cooking vessel is formed with a shoulder 30 on its inner periphery near the rim 20 and a tubular perforated sleeve 31 having a flange 32 engageable on that shoulder is provided for removable positioning within the vessel. A vapor exhaust coupling 33 is mounted within the vessel wall and has an upwardly directed stand pipe 34 extending through an aperture in the flange 32 of the sleeve 31 and terminating adjacent the undersurface of cover 12 when the cover is closed. Mounted on the inner surface of the vessel below the normal liquid level therein (as indicated at LL) is a group of heating coils 35, 36, 37, and a conventional thermostat bulb 38 with a capillary tube 39 leading therefrom a disposed adjacent the coils. A formanious basket 40 for containing food to be cooked includes a handle 41 and supporting rods 42, 43 projecting laterally from the handle and adapted to rest upon the flange of the sleeve. As will be apparent, the sleeve 31 serves to protect the coils and thermostat from being struck by the basket, serves to shield the coils from being clogged with food particles dropping from the basket, and aids in the convection flow of cooking liquid.

Figure 5:
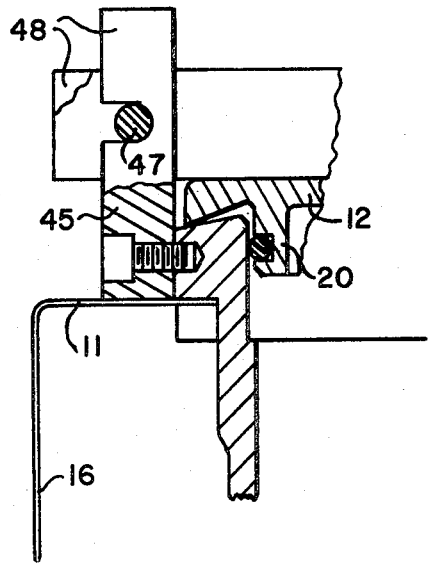
FIG. 5 is a sectional view taken on line 5—5 of FIG. 3.

Passing now to FIGS. 3 to 5, a pair of standards 45, 46 are attached to the rim 20 of the vessel and rest on the cabinet top 11 diametrically and outboard of cover 12, and may be so located as to permit the cover to be lifted from the left hand side, right hand side, or front of the cabinet. One of these standards, such as 45, houses an elongated pivot pin 47 which extends through a closely fitting aperture in a first pair of parallel rods 48, 49. These rods are fixed on their lower surfaces to the upper surface of cover 12 and at their distal ends are provided with an elongated slot 50 (FIG. 4) within which a second pin 51 is adapted to slide.

In board of the fixed rods 48, 49 is a second pair of spaced parallel longitudinally slidable rods 52, 53 having an elongated slot 54 at one end cooperating with the fixed pivot pin 47. The second pin 51 extends through closely fitting apertures in these slidable rods at the other end and may have handles 56, 57 extending therefrom for use in manipulating the cover of the vessel. A third pin 58 (herein called the abutment pin) extends between the slidable rods adjacent the pivot pin 47, and a fourth pin 59 (herein called the fulcrum pin) extends between the rods 48, 49 and cooperates with a slot 60 formed in the slidable rods. Attached to the standard 46 is a bracket 61 offset to accomodate outward movement of pin 51 and with an overhanging portion 62, the purpose of which will later appear.

Figure 2:
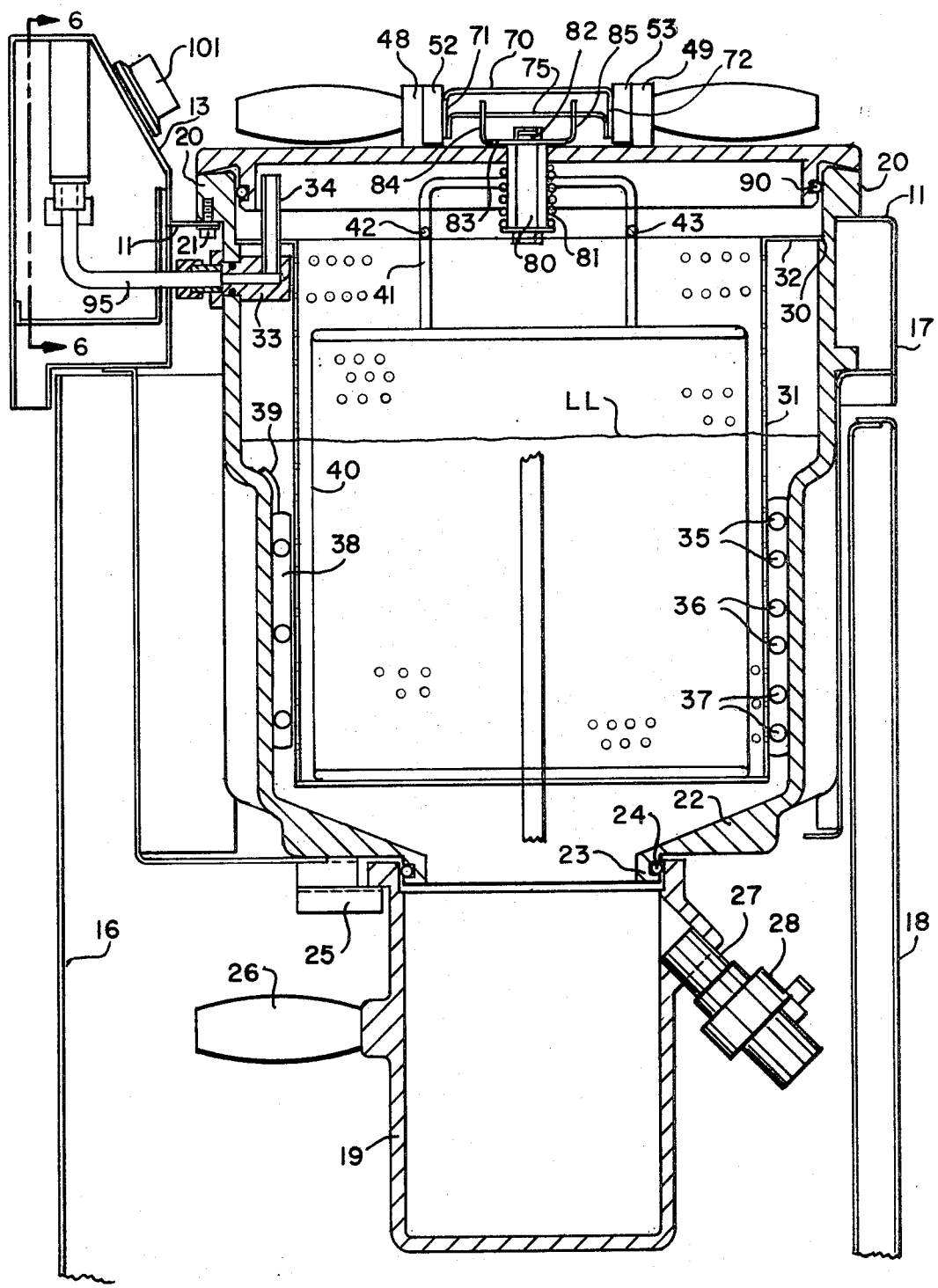
FIG. 2 is a view partly in section taken on line 2—2 of FIg. 1 and to a larger scale, the vessel cover being indicated as pivoted for movement in an opposite direction.

For safety of the operator of the apparatus, there is provided with the described cover assembly a manually operable relief valve actuator including a member having a top portion 70 and with depending side walls 71, 72 closely fitting between the slidable rods 52,53 as best shown in FIG. 2. These side walls are formed with slots corresponding to the slot 60 in the slidable rods and are engageable with the fulcrum pin 59 to permit limited movement of the member to the right as seen in FIG. 4. At their distal ends these side walls are provided with an overhanging portion 73 extending above the abutment pin 58 when the slide occupies its valve-closing position and with the ends of these side walls having an abrupt edge 79 preventing movement of pin 58 to the right except when the member is in its upwardly pivoted position. Extending upwardly from the member at its proximate end is a handle 74 and extending between and affixed to the side walls 71, 72 and between pins 58 and 59 is a first bracket 75.

A conventional relief valve 80 biased to closed position by a compression spring 81 has its sleeve attached as by a bolt 82 to the base 83 of a second bracket loosely disposed above the cover 12 and below the top portion 70 of the member as seen in FIG. 2. The sleeve is movable within an aperture in the cover 12 of the vessel and when the second bracket base 83 is lifted, either by pressure alone within the vessel or by the now to be described mechanical arrangement, the vessel is vented into the space within the member. In order to effect this valve lifting the second bracket is provided with side walls 84, 85 having notches therein into which the first bracket 75 of the member engages. As will now be apparent, the pressure within the vessel may be vented at any time during operation, but preferably only at the end of a cooking operation. Thus, by pivoting the left hand end of the member upwardly as seen in FIG. 4 to cause the first bracket 75 to lift the second bracket, the valve is opened against the bias of its spring 81.

With the member in the upwardly pivoted position the abutment edge 79 is removed from the path of movement of pin 58 and the slidable rods 48, 49 may now be moved, as by grasping of handles 56, 57, to the extent permitted by the engagement of pin 51 in the slots 50 of those rods. The extent of this movement is sufficient to disengage pin 51 from standard 46 whereupon the cover 12 may then be pivoted at slight distance upward about pin 47. However, at this time the pin 51 can rise only into contact with the bracket overhang 62 and since the seal provided by the O-ring 90 between the cover 12 and the shoulder 20 of the vessel is now broken any remaining pressure within the vessel may vent from the periphery of the partially opened cover and without causing splashing of the hot liquid. After such venting the handles 56, 57 are again moved to the left to avoid the obstruction of the bracket overhang and to allow the cover to be pivoted to fully open position. With the cover thus opened the relief valve 80 no longer needs to be held open and due to the bias of spring 81 it is closed and the projection 73 of the member comes to rest above pin 58 and with the abutment edge 79 again in its guarding position in advance of pin 58.

Apart from the safety features associated with the cover, protection against excessive pressures developing during cooking is provided by another relief valve now to be described. Mounted behind the rear plate 13 is a weight 91 having an extension 92 freely movable within a tubular housing 93 with a clearance therebetween. At its lower end the extension rests upon a ball valve 94 having a hollow valve seat communicating with the coupling 33 through a pipe 95. A rigid projection 96 attached to the weight and mounted exteriorly of the housing 93 extends into the path of movement of an armature 97 controlled by a solenoid 98 and normally held in lifting contact and with the projection 96 by a tension spring 99. When, therefore, the solenoid is energized the weight serves to hold valve 94 closed against a predetermined pressure, for example about 14 p.s.i.g. within the cooking vessel. On the other hand when the solenoid is de-energized the cooking vessel will be vented when any pressure sufficient to lift the ball valve 94 is present since at this time the spring will have lifted the weight 91-92 from contact with the ball valve 94.

Figure 8:
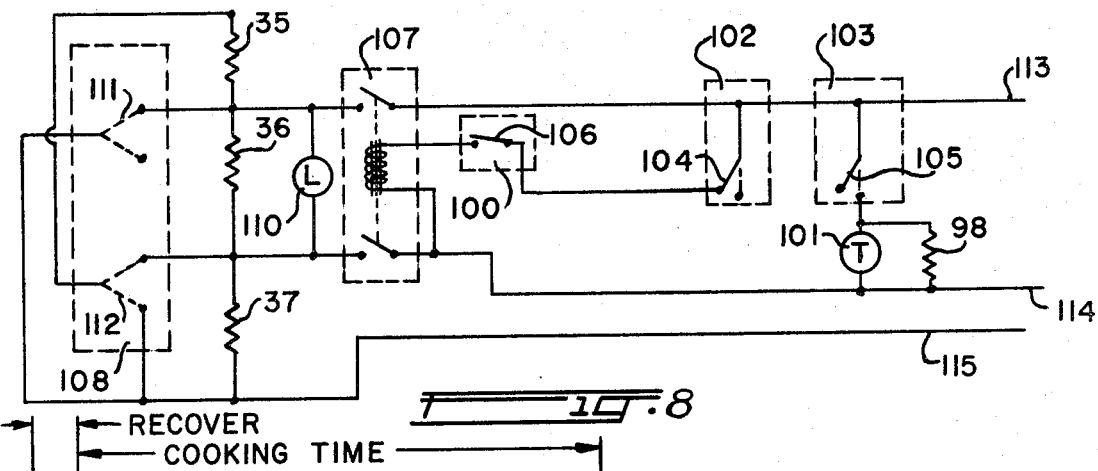
FIG. 8 is a wiring diagram for the electrical components of the apparatus.
Figure 7:
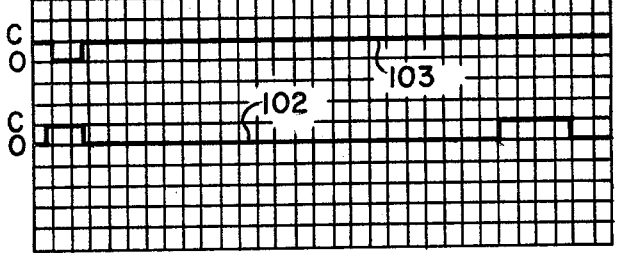
FIG. 7 is a chart showing the relation of timer driven cams to cooking time.

Referring now to FIGS. 7 and 8, the apparatus employs in conjunction with the above described mechanical elements an electrical circuit including a conventional thermostat 100 which is manually adjustable and which may be of the type exemplified by Model KX-94-24 available from Robertshaw Controls, Youngwood, Pa. This thermostat is mounted on the rear of plate 13 with its adjustable dial exposed on the front of that plate as seen in FIG. 1. An adjustable timer 101 is similarly mounted on the plate and may be of the manually preset, noncycling type as exemplified by Model 571 available from Conrac Corp., New York, N.Y. The timer shaft drives cam plates, two of which are diagrammatically indicated at 102, 103 and which shift appropriate switches 104, 105 between open and closed positions. The internal switch 106 of the thermostat likewise is movable between open and closed positions. A conventional relay 107 and a conventional terminal board 108 are mounted on the rear of plate 13 and a light 110 is visible on the front of that plate to indicate when current is being supplied to the heating coils. By means of suitable jumpers 111, 112 the terminal board may easily be connected to supply single phase or three phase current from the conductors 113, 114, 115 to the heating coils.

OPERATION

With the foregoing in mind and assuming that chicken is to be cooked in the apparatus, the adaptability of the invention will be apparent from the following description of a cycle of cooking. In different regions of the country the preference for taste, crispness, color and other characteristics of the cooked product may vary, but by choosing a particular design of cams for the electrical circuit such variations may be accomodated.

Having filled the cleaned vessel and its attached collector unit to the proper level with cooking fat, the fat is first heated to the temperature, for example 400° F., determined to be the most desirable temperature at the time when the uncooked chicken is loaded into the apparatus. The thermostat 100 is turned from its off position to close its switch 106 to a 400° F. setting and the timer is set to the recover position indicated in FIG. 7. At this position of the timer, cam 102 has closed switch 104 permitting power to be supplied through thermostat switch 106 to relay 107. Relay 107 therefore has its contacts closed to supply power to heaters 35, 36 and 37 and to illuminate light 110. Also during this recover cycle cam 103 opens switch 105 with the result that the timer motor 101 is idle and the vent solenoid 98 is deenergized permitting spring 99 to lift the weight assembly 92.

When the temperature of the fat reaches the prescribed value, bulb 38 senses that temperature and communicates a pressure signal through capillary 39 to the internal mechanism of thermostat 100 causing the switch 106 to open, deenergizing relay 107, and cutting off power to the heaters. When light 110 goes out the operator then knows that the shortening has reached the desired cooking temperature and the prepared chicken pieces are then dropped into the basket piece by piece to seal each surface of the chicken pieces before they are laid in contact with each other. The collector unit, of course, is functioning during this period to collect any fragments of breading or the like which are dislodged into the heated liquid.

The lid 12 may now be closed and latched as previously described and timer 101 is set to the desired cooking time, for example, 11 minutes. Thus, at the selected time, cam 102 opens switch 104 in series with the heater relay and the thermostat thereby to prevent the heaters from being reenergized. Also cam 103 closes switch 105 to cause the timer motor to run and to energize the vent solenoid 98 whereupon the pressure within the vessel is held to a predetermined maximum value, for example 14 p.s.i.g., under the influence of the described weight assembly. As will be understood, the pressure value is determined by cooking and by safety considerations. During this cooking period the temperature of the chicken will rise and boiling of moisture contained in the chicken will occur at the surface of the chicken. The resulting steam will be held in the vessel until the weight assembly is lifted by that internal pressure and which pressure will be held constant in the vessel throughout the remainder of the cooking cycle.

The timer motor drives both cams 102 and 103 automatically and in due time advances cam 102 to the three minute point whereupon it closes switch 104. It will be appreciated that the boiling of moisture from the chicken will now have dropped the temperature of the liquid fat to the point where the thermostat switch will have closed. Thus, with switches 104 and 106 both closed, relay 107 again will be energized to supply power to the heaters and with the increased heating the excess fats are driven out of the chicken and crispness of the cooked product is obtained.

The cam 102, in this example, is designed so as to reopen switch 104 at the one minute point and while the timer continues to run. However, as the timer finishes its cycle and reaches the zero time point, cam 102 again closes switch 104 as switch 105 is opened by cam 103 to stop the timer. As the timer stops the solenoid 98 is deenergized and spring 99 lifts the weight assembly 92 to cause the internal pressure within the cooking vessel to be exhausted automatically. At this time the cooking will have been completed and the described handle 74 on the cover can be manually activated to further exhaust the pressure preparatory to opening the cover of the vessel. The cooked chicken is then lifted out in the basket 40, placed on a suitable tray, and the basket replaced.

As above described, the termination of the cooking cycle was preceeded by having the cam 102 turn the heaters back on just prior to deenergization of the timer motor. Accordingly, as the cooked chicken of a completed cycle is being removed from the apparatus and while the timer is resting in its recover position the heaters are returning the cooking liquid to a 400° F. temperature in readiness for the next cooking cycle. About five minutes of time will generally be sufficient for this heat recovery.

When the collector unit accumulates sufficient quantity of food particles, or at the end of a day of operation, the door 18 of the cabinet is opened and valve 28 is opened to drain all of the remaining liquid from the vessel into a suitable container. Handle 26 is then manipulated to unlock the collector unit from the vessel and the unit is emptied of its contents. The cooked food particles which have accumulated will be found to be unburned and suitable for further use as desired, for example as a flavorable ingredient for making gravy. By means of the described combination of structure and operation of cooking, no need for a filtration system is present and the interior of the vessel and collector unit may be easily cleaned in preparation for the next day of operation.

Having thus described the preferred operation and the coordinated apparatus comprising the invention, it will be understood that other forms of apparatus may likewise be employed without departing from the invention as expressed in the appended claims.

What is claimed is:

1. A cooking apparatus comprising an open-top pressure vessel having a tubular side wall and adapted to contain a replaceable batch of cooking liquid, means disposed within said vessel for rapidly heating said liquid by direct contact therewith, a sealable cover for said vessel pivotally mounted adjacent an upper portion of the vessel wall, a removable collector unit attached to a lower portion of said wall and in open communication at all times with the central lower end of said vessel, said unit being adapted to retain loose food particles dropping from said vessel and to contain a relatively cool and quiescent portion of said liquid, selectively operable drainage means for draining by gravity the batch of liquid from said vessel and from the upper portion of said unit prior to removing the collected food particles from said unit, a foraminous basket insertable into said vessel for holding food to be cooked, and means for automatically releasing vapor from said vessel when a predetermined vapor pressure is reached therein.

2. Apparatus as defined in claim 1 including a tubular foraminious sleeve removably disposed within said vessel between the basket and the vessel wall.

3. Apparatus as defined in claim 2 wherein said heating means comprises an electrical resistor disposed between the vessel wall and said sleeve, the presence of said sleeve aiding in establishing an upwardly directed convection current of hot liquid in the space between said sleeve and said wall.

4. Apparatus as defined in claim 1 said cover includes a first pair of rods fixed to the top of said cover diametrically thereof and pivotally mounted upon a first standard projecting above said vessel, and a second pair of slidable rods parallel to said fixed rods and joined at one end by a pin movable within slots in said fixed rods and detachably engageable with a second standard projecting above said vessel diametrically opposite said first standard whereby upon moving said slidable rods in one direction to bring said pin out of engagement with said second standard, said cover may be pivoted upwardly and upon moving said slidable rods in an opposite direction with the cover closed to bring said pin into engagement with said second standard said cover may be locked in closed position.

5. Apparatus as defined in claim 4 including a bracket attached to said second standard and having an overhanging portion adapted to be engaged by said pin when the cover is initially raised thereby to permit escape of vapor from said vessel prior to fully opening said cover.

6. Apparatus as defined in claim 1 wherein said collector unit is detachably locked upon said lower portion of said vessel wall and is removable downwardly following the draining of liquid from said vessel and from said unit.

7. Apparatus as defined in claim 1 wherein said drainage means includes a drain pipe extending laterally from the wall of said collector unit at a location adjacent the upper end of said unit, and a valve disposed in said pipe, said pipe being adapted to drain the liquid from said vessel and from the upper portion of said collector unit when said valve is in open position.

* * * * *